United States Patent
Sasaki

(10) Patent No.: US 7,552,887 B2
(45) Date of Patent: Jun. 30, 2009

(54) INFORMATION MEDIUM

(75) Inventor: Morimasa Sasaki, Tokyo (JP)

(73) Assignee: TDK Corporation, Tokyo (JP)

( * ) Notice: Subject to any disclaimer, the term of this patent is extended or adjusted under 35 U.S.C. 154(b) by 27 days.

(21) Appl. No.: 12/019,164

(22) Filed: Jan. 24, 2008

(65) Prior Publication Data

US 2008/0179439 A1    Jul. 31, 2008

(30) Foreign Application Priority Data

Jan. 26, 2007    (JP)    ............................. 2007-016457

(51) Int. Cl.
*G11B 23/04*    (2006.01)
(52) U.S. Cl. ................................. 242/345.2; 242/345.3
(58) Field of Classification Search ................. 242/345, 242/345.2, 345.3, 347, 341
See application file for complete search history.

(56) References Cited

U.S. PATENT DOCUMENTS

| | | | | |
|---|---|---|---|---|
| 4,101,096 | A | * | 7/1978 | Oishi et al. ............... 242/345.2 |
| 4,102,515 | A | * | 7/1978 | Milants .................... 242/345.2 |
| 4,309,002 | A | * | 1/1982 | Saitou et al. ............. 242/345.2 |
| 4,466,036 | A | * | 8/1984 | Ishida et al. ............. 242/345.2 |
| 4,516,181 | A | * | 5/1985 | Shirako .................... 242/345.3 |
| 4,685,638 | A | * | 8/1987 | Satoyoshi et al. ........ 242/345.2 |
| 4,742,417 | A | * | 5/1988 | Komiyama et al. ......... 360/132 |
| 4,881,146 | A | * | 11/1989 | Bordignon ............... 242/345.3 |
| 4,889,296 | A | * | 12/1989 | Watanabe et al. ........... 242/347 |
| 5,377,066 | A | * | 12/1994 | Katagiri ...................... 360/132 |
| 5,402,296 | A | * | 3/1995 | Manzke et al. .............. 360/132 |
| 6,622,952 | B2 | * | 9/2003 | Onmori et al. ........... 242/345.3 |
| 6,837,454 | B2 | * | 1/2005 | Asano ........................ 242/341 |
| 7,284,722 | B2 | | 10/2007 | Sasaki et al. |
| 2005/0274839 | A1 | | 12/2005 | Sasaki et al. |
| 2006/0169817 | A1 | | 8/2006 | Sasaki et al. |
| 2007/0183094 | A1 | | 8/2007 | Sasaki |
| 2008/0035776 | A1 | | 2/2008 | Sasaki et al. |

FOREIGN PATENT DOCUMENTS

JP    2000-137971    5/2000

OTHER PUBLICATIONS

English language Abstract of JP 2000-137971, May 16, 2000.

* cited by examiner

*Primary Examiner*—William A Rivera
(74) *Attorney, Agent, or Firm*—Greenblum & Bernstein, P.L.C.

(57) ABSTRACT

An information medium capable of preventing tape reels from being inclined during driving and improving the manufacturing efficiency. The information medium includes a pair of tape reels having a magnetic tape wound around, a casing body rotatably accommodating the tape reels, and a pair of sheets having a pair of insertion holes formed, respectively. A pair of plate-shaped spring members each formed with an insertion hole are arranged between one sheet and one main board, for urging respective ends of hubs of the tape reels via the sheet, with the associated end of the hub inserted into the insertion hole. Each spring member is fixed to the main board, by being fitted on an outer periphery of an associated annular protrusion formed on the one main board.

4 Claims, 8 Drawing Sheets

INFORMATION MEDIUM

BACKGROUND OF THE INVENTION

1. Field of the Invention

The present invention relates to an information medium provided with a pair of tape reels having a magnetic tape wound therearound, and a casing body rotatably accommodating the tape reels.

2. Description of the Related Art

As an information medium of this kind, there is known a tape cartridge disclosed in Japanese Laid-Open Patent Publication (Kokai) No. 2000-137971. This tape cartridge is comprised of a pair of reels having a magnetic tape wound therearound, a shell formed by an upper half and a lower half, and an upper sheet and a lower sheet disposed in the shell in a manner sandwiching the reels. In this case, each reel includes an inner hollow cylindrical portion in the form of a hollow cylinder, and an outer hollow cylindrical portion formed along the outer periphery of the inner cylindrical portion in a manner continuous therewith. The upper end and the lower end of the inner hollow cylindrical portion are configured such that they protrude from the upper end and the lower end of the outer hollow cylindrical portion, respectively, and the lower end of the inner hollow cylindrical portion is loosely fitted in a reel-receiving portion of the lower half of the shell, whereby the reel is rotatably accommodated in the shell. Further, the inner peripheral surface of the inner hollow cylindrical portion of the reel is formed with convex portions for being engaged with a drive shaft (spindle) of a recording and reproducing device when the drive shafts are inserted.

SUMMARY OF THE INVENTION

From the study of the aforementioned tape cartridge, however, the present inventor found the following problems: A tape cartridge of this kind, such as the aforementioned tape cartridge, is configured such that so as to permit each drive shaft of the recording and reproducing device to be smoothly inserted into the inner hollow cylindrical portion of each reel, a gap is formed between the inner peripheral surface of the inner hollow cylindrical portion of the reel and the drive shaft. Further, the tape cartridge of this kind is configured such that for smooth rotation of each reel, gaps are also formed between the shell and the inner hollow cylindrical portion of the reel and between the shell and the outer hollow cylindrical portion thereof. On the other hand, among recording and reproducing devices for the tape cartridge of this kind (e.g., a tape cartridge 201 shown in FIG. 14), there is one generally configured as shown therein, such that reels of the tape cartridge are driven in a state in which the foremost end of each drive shaft 101 is inserted to a position corresponding to approximately one half of the height (vertical length) of the inner cylindrical portion of each reel. Further, in this recording and reproducing device, as shown in FIG. 15, a helical scan method is employed in which a magnetic tape T is brought into contact with an outer peripheral surface of a rotary head 102 by a plurality of guide rollers 103 and guide pins 104 to thereby perform recording and reproduction of data. This causes a relatively large tension to be applied to the magnetic tape T during driving of the reels.

In recent years, a tape cartridge (e.g., a tape cartridge 202 shown in FIG. 16) has been devised which uses a magnetic tape a width of which is made approximately twice as large as that of the conventional ones so as to increase recording capacity. When this tape cartridge is driven by the recording and reproducing device described above, as shown in FIG. 16, the vertical length of the portion within which the inserted drive shaft 101 does not extend increases. Further, in the tape cartridge 202 using the magnetic tape increased in width, compared with a tape cartridge using a tape with a smaller width, it is necessary to increase the distance over which the tape is brought into contact with the rotary head 102 due to the increased width of the tape (see FIG. 10), which also increases a tension applied to the magnetic tape T. Therefore, the moment acting on an upper portion of the inner hollow cylindrical potion into which the drive shaft 101 is not inserted, by the tension applied to the magnetic tape, also increases as the width of the tape is increased. As a result, there is a fear that this moment and the inclination of the reel caused by the aforementioned gap, which have been negligibly small when the tape width is small, increase as the width of the tape increases. Therefore, in the tape cartridges of the above-mentioned kind, there is a fear that the rotations of the reels in the inclined state can cause the magnetic tape T to run in a meandering manner or in a state laterally shifted toward one side, thus hindering proper recording or reproduction of data. Further, there is another fear that the running of the magnetic tape T in the meandering manner or in the state laterally shifted toward one side causes an edge of the magnetic tape T (end in the direction of the width thereof) to be rubbed hard against the upper sheet or the lower sheet, whereby the magnetic tape T is damaged.

As a means for solving this problem, the present inventor has already developed a tape cartridge in which an urging member is disposed between a main board (top board) and an upper sheet, for prevention of the inclination of the reels. In this case, this tape cartridge is configured such that to prevent the urging member from coming off during assembly, the urging member is fixed to the cartridge by swaging using a seizing device. However, this configuration can cause a sharp increase in the manufacturing cost due to lowered manufacturing efficiency due to the troublesome operation for fixing the urging member. Improvement in this respect is desired. Further, when the urging member is fixed by swaging, the elastic deformation of the urging member can be hampered to lower the urging function which the urging member has. Improvement in this respect is also desired.

The present invention has been made in view of these problems, and a main object of the present invention is to provide an information medium which is capable of preventing tape reels from being inclined during driving thereof and improving the manufacturing efficiency.

To attain the above main object, an information medium according to the present invention comprises a pair of tape reels each having a hollow cylindrical reel body having a magnetic tape wound therearound, and a hollow cylindrical hub disposed at a central portion of the reel body in a manner such that opposite ends thereof protrude from the reel body, a casing body rotatably accommodating the pair of tape reels in a state holding opposite ends of the hubs by a pair of main boards facing each other, one of the main boards being formed with a pair of annular protrusions, for positioning associated ones of the ends of the hubs, a pair of sheet materials each having a pair of insertion holes formed therein, and arranged in the casing body in a manner sandwiching opposite ends of each reel body in a state having the opposite ends of the hubs inserted into the insertion holes, and a pair of plate-shaped urging members arranged between one of the sheet materials, which is disposed on a side opposite to an insertion side of a drive shaft that drives the tape reel, and the one of the main boards, each urging member being formed with an insertion hole that urges the ends of the reel bodies via the one of the sheet materials, in a state thereof in which each urging member has an associated one of the ends of the hubs inserted into the insertion hole thereof, the urging member being configured to be capable of being fixed to the one of the main boards, by being fitted on an outer periphery of an associated one of the annular protrusions.

According to this information medium, since the urging member is arranged between one of the sheet materials, which is disposed on a side opposite to an insertion side of a drive shaft that drives the tape reel, and the one of the main boards, it is possible to urge the ends of the reel bodies positioned on the side opposite to the insertion side of the drive shaft toward the other of the main boards by the urging member. Therefore, it is possible to urge the ends of the reel bodies located on the insertion side of the drive shafts against the other of the main boards via the sheet material. As a result, even when a relatively large tension is applied to the magnetic tape so as to bring the magnetic tape into contact with the rotary head of a drive unit, and a large moment acts on the tape reels due to the tension, the tape reels can be positively prevented from being inclined. Therefore, according to the information medium, it is possible to positively prevent the recording and reproduction of data from being hindered by running of the tape in a meandering manner or in a state laterally shifted toward one side, which can be caused by the rotations of inclined tape reels, or the magnetic tape from being damaged by having an edge (end in the direction of the width thereof) thereof rubbed hard against the sheet material. Further, by configuring each urging member such that it can be fitted on the outer periphery of the associated protrusion formed on the one main board, it is possible to fix the urging members to the main board only by fitting the urging members on the outer periphery of the associated protrusion. Therefore, compared with the construction in which the spring members are fixed by seizing, it is possible to sufficiently improve the efficiency of the operation of fixing them. Further, by fixing the urging members to the main board in advance, it is possible to positively prevent each urging member from coming off when assembling the casing body. As a result, it is possible to sufficiently improve the efficiency of the operation of assembling the casing body. Therefore, according to the information medium, it is possible to sufficiently improve the manufacturing efficiency. Further, since each urging member is fixed to the main board by fitting the same on the outer periphery of the associated protrusion, it is possible to positively urge the tape reel by the urging member without the elastic deformation of the urging member being hampered, differently from the construction in which the urging member is fixed to the cover by swaging.

In this case, each urging member can be configured to be provided with fixing nails for being fitted on the outer periphery of the associated one of the annular protrusions. With this configuration, the nails can be formed by a simple working process of bending outer peripheral portions of the urging member, which makes it possible to hold the manufacturing cost of the urging member at a low level.

Each urging member can be configured to be provided with three of the nails. With this configuration, differently from an urging member which is provided with not more than two nails, the urging member can be fixed to the upper end of the reel body such that it is parallel or substantially parallel thereto. Therefore, it is possible to evenly urge the end via the sheet material, whereby it is possible to more positively prevent the tape reel from being inclined. Further, compared with an urging member which is provided with four or more nails, the working of the urging member is easy to carry out, so that it is possible to hold the manufacturing cost of the urging member at a further lower level.

Further, each urging member can be configured to comprise three protrusions capable of urging three portions of an associated one of the ends of the reel body via the one of the sheet materials. With the configuration of this embodiment, differently from urging members each having two or less or four or more convex portions, all the three convex portions positively urge the end of the reel body via the associated sheet, and hence it is possible to evenly urge the end, thereby making it possible to more positively prevent the tape reels from being inclined.

It should be noted that the present disclosure relates to the subject matter included in Japanese Patent Application No. 2007-016457 filed Jan. 26, 2007, and it is apparent that all the disclosures therein are incorporated herein by reference.

BRIEF DESCRIPTION OF THE DRAWINGS

These and other objects and features of the present invention will be explained in more detail below with reference to the attached drawings, wherein.

DESCRIPTION OF THE PREFERRED EMBODIMENTS

Hereinafter, the best mode of an information medium according to the invention will be described with reference to the accompanying drawings.

First, a description will be given of the construction of the information medium 1 with reference to the drawings.

Figure 1:
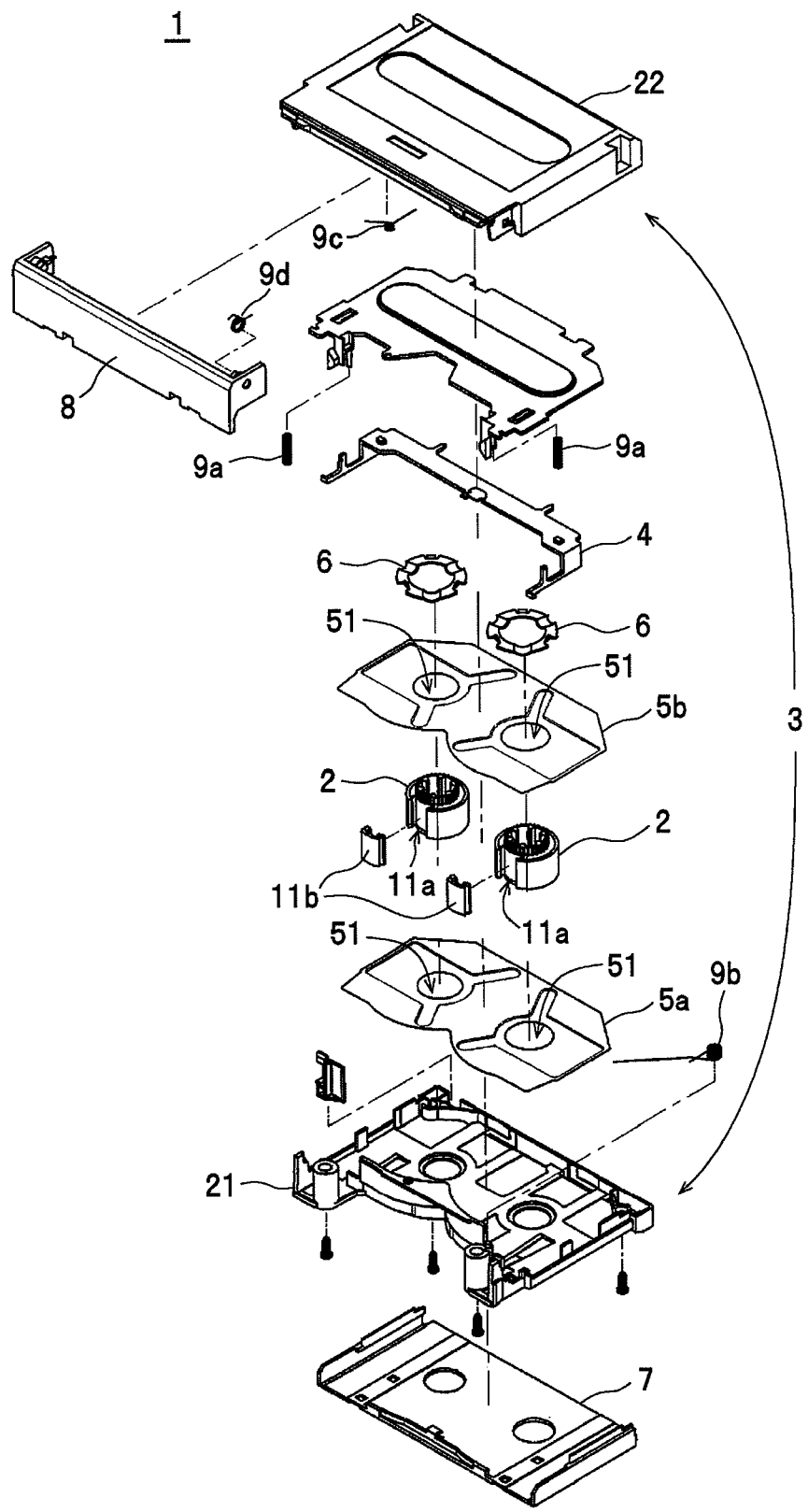
FIG. 1 is an exploded perspective view of an information medium.
Figure 2:
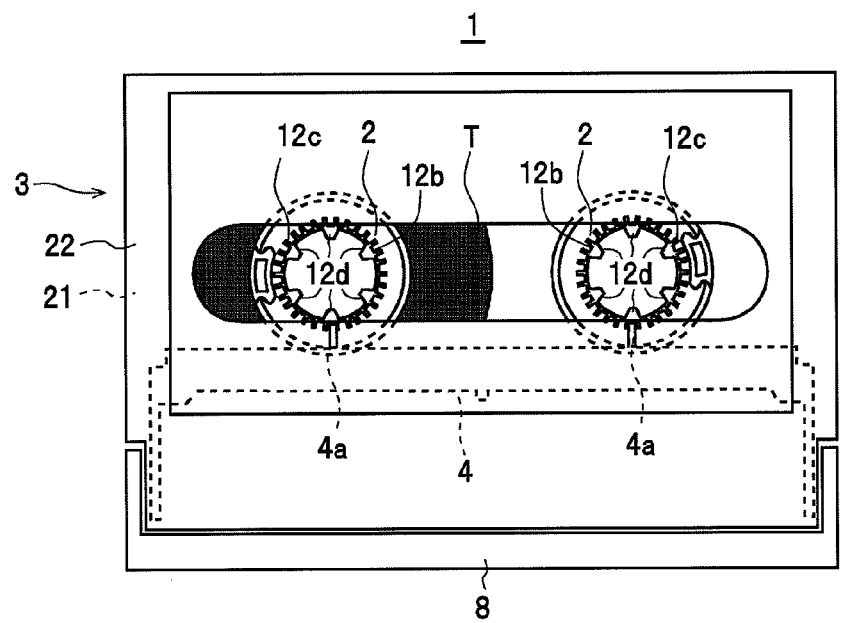
FIG. 2 is a plan view of the information medium.
Figure 3:
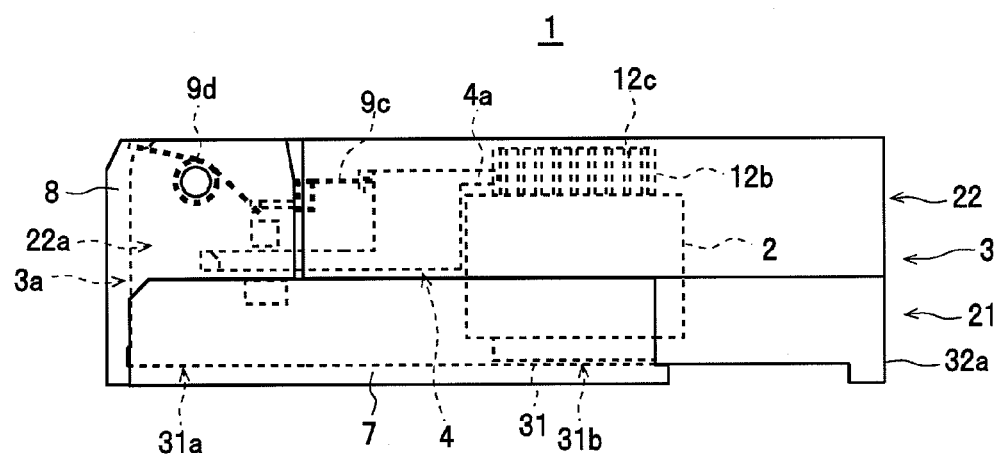
FIG. 3 is a side view of the information medium.

Referring to FIGS. 1 to 3, the information medium 1 is e.g., a two-reel type information medium for use as a storage device for backing up data recorded on an electronic computer, and is comprised of tape reels 2 and 2 wound with a magnetic tape T (see FIGS. 2 and 9), a casing body 3, a reel brake 4, sheets 5a and 5b (see FIG. 1: hereinafter, each also referred to as "the sheet 5" when one is not distinguished from the other), spring members 6 and 6 (see FIG. 1), a sliding section 7 (see FIGS. 1 and 3), and a lid 8. In this case, the information medium 1 employs a magnetic tape T having a tape width of 8 mm, for example, and the sizes and the shapes of the component elements constructing the information medium 1 are defined in a manner adapted to the magnetic tape T.

Figure 7:
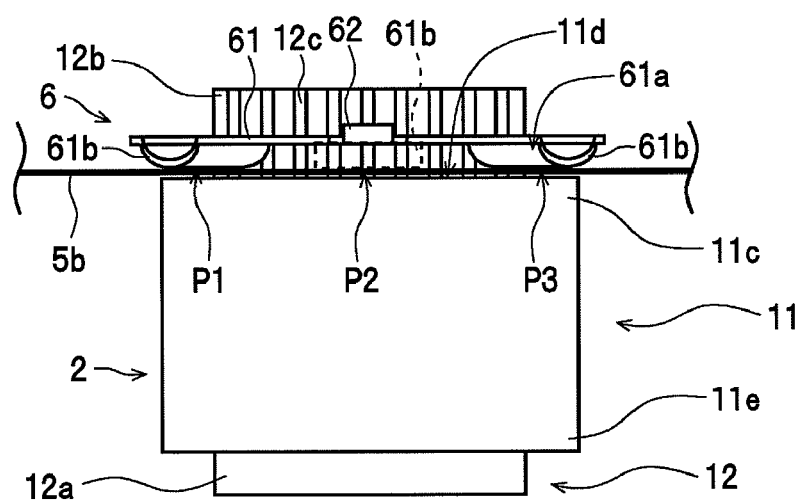
FIG. 7 is a side view of a tape reel, a sheet, and the spring member in an arranged state.
Figure 9:
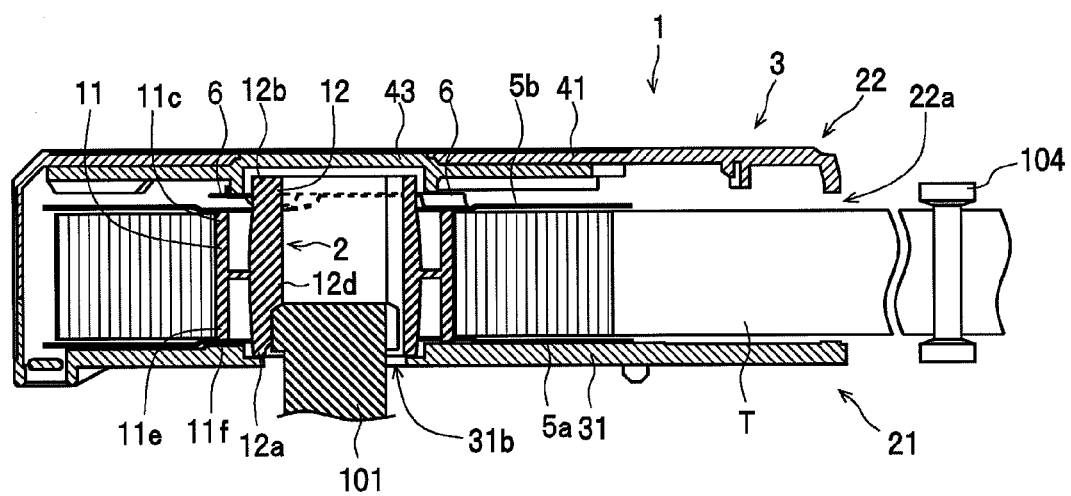
FIG. 9 is a cross-sectional view of the information medium.

Referring to FIG. 7, each tape reel 2 is comprised of a reel body 11 and a hub 12. The reel body 11 is in the form of a hollow cylinder and is configured such that the magnetic tape T can be wound therearound. Further, as shown in FIG. 1, the reel body 11 has an outer periphery formed with a clamp-accommodating portion 11a in which can be fitted a clamp 11b for fixing a leader tape, not shown, attached to an end of the magnetic tape T, to the reel body 11. As shown in FIG. 7, the hub 12 is formed to have a hollow cylindrical shape, and is disposed through a central portion of the reel body 11 such that a lower end 12a and an upper end 12b thereof protrude from the reel body 11. Further, as shown in FIGS. 2 and 3, the hub 12 has an upper end 12b formed with teeth 12c with which an associated one of protrusions 4a of a reel brake 4 is engaged to thereby restrict the rotation of the tape reel 2. Further, as shown in FIGS. 2 and 9, the hub 12 has an inner peripheral surface formed with e.g., six engaging protrusions 12d which can be engaged with drive shafts 101 of a drive unit (recording and reproducing device) (see FIG. 9). In this case, as shown in FIGS. 2 and 9, the tape reel 2 is rotatably accommodated within the casing body 3 in a state in which the lower end 12a and the upper end 12b of the hub 12 are supported (positioned) by a bottom board 31 of a lower casing 21, described hereinafter, and (a cover 43 attached to) a top board 41 of an upper casing 22, described hereinafter, of the casing body 3. It should be noted that the top board 41 and the cover 43 correspond to one of main boards in the present invention, and the bottom board 31 correspond to the other of the main boards in the present invention.

Figure 4:
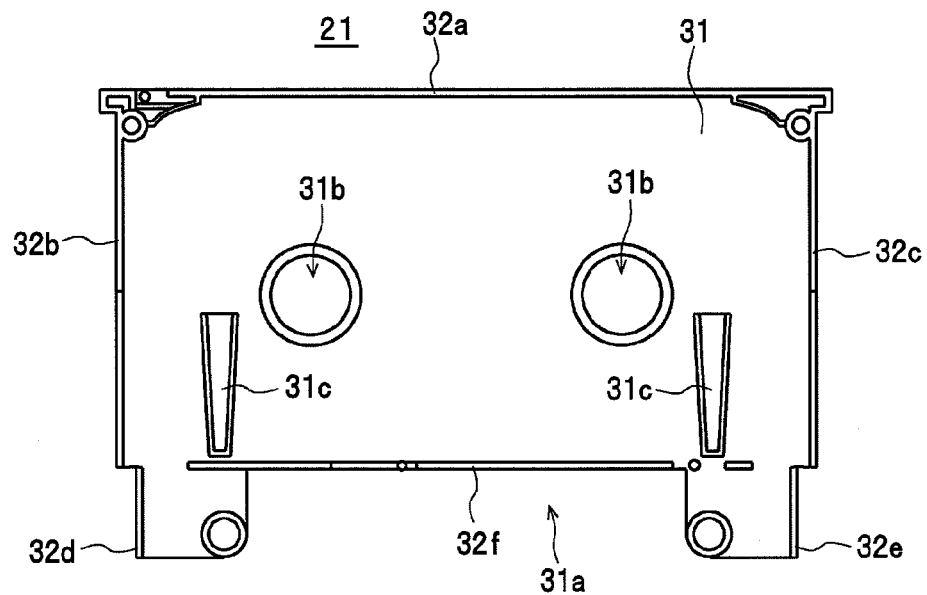
FIG. 4 is a plan view of a lower casing, as viewed from an inner side thereof.

Referring to FIGS. 1 and 3, the casing body 3 is comprised of the lower casing 21 and the upper casing 22, which are capable of being fitted to each other, and rotatably accommodates the tape reels 2 and 2 in an internal space formed when the casings 21 and 22 are fitted to each other. As shown in FIG. 4, the lower casing 21 is comprised of the bottom board 31, and side walls 32a to 32f erected on the edges of the bottom board 31, and is formed to be generally shallow plate-shaped.

The bottom board 31 has a cutaway portion 31a formed at a central portion thereof on a front side (lower side, as viewed in FIG. 4). In this case, a tape draw-out opening tape 3a (see FIG. 3) for drawing out the magnetic tape T is formed by the cutaway portion 31a and an opening 22a of the upper casing 22, described hereinafter. Further, the bottom board 31 is formed with circular insertion holes 31b and 31b for supporting the lower ends 12a of the hubs 12 of the tape reels 2 by edges thereof, and having the drive shafts 101 of the drive unit inserted therethrough. Further, formed on the side toward the cutaway portion 31a of the bottom board 31 are arm-like locking portions 31c and 31c for locking the sliding section 7 in a non-slidable state. In this case, each locking portion 31c has a foremost end thereof urged toward the sliding section 7 by an associated one of lock springs 9a appearing in FIG. 1.

Figure 5:
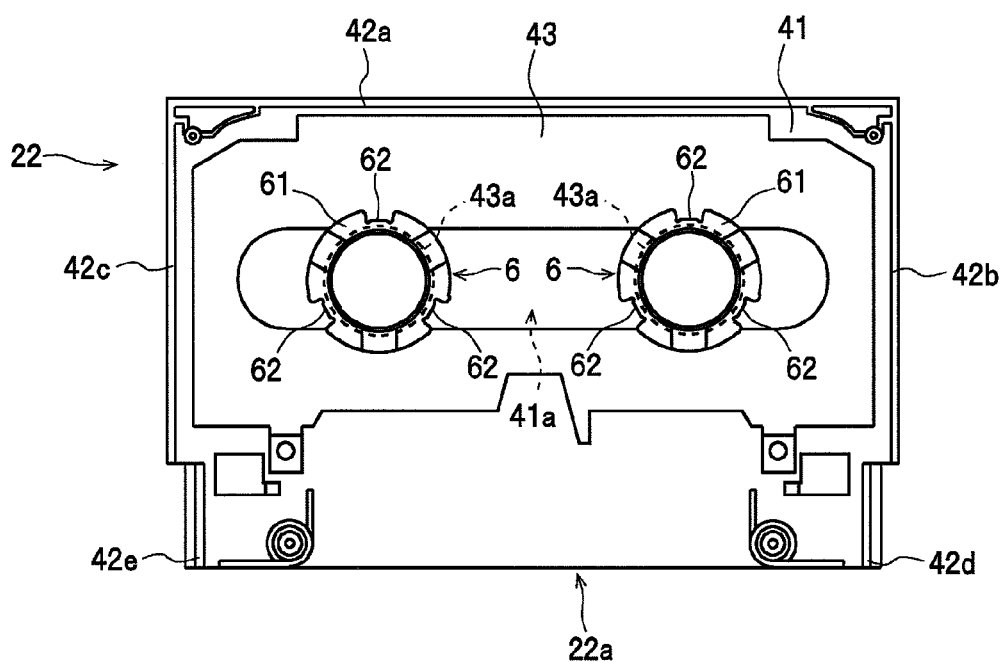
FIG. 5 is a plan view of an upper casing, as viewed from an inner side thereof.
Figure 8:
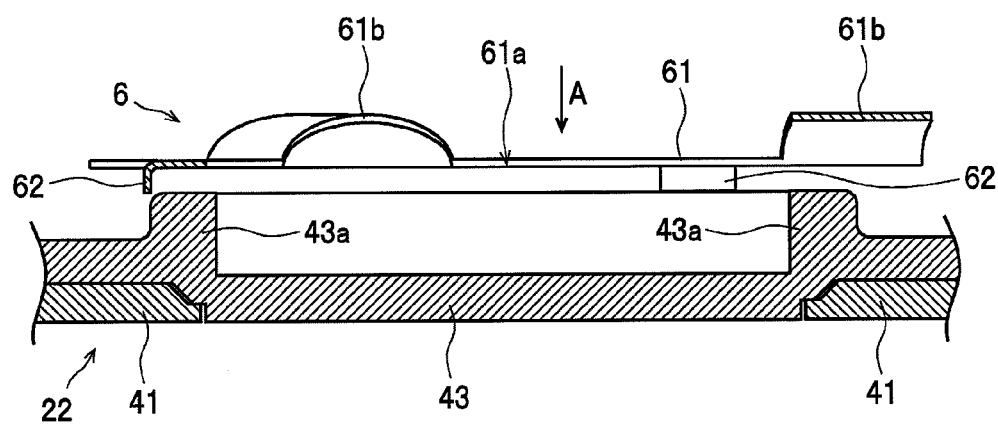
FIG. 8 is a diagram which is useful in explaining a method of mounting the spring member on a cover.

Referring to FIG. 5, the upper casing 22 is comprised of the top board 41, and side walls 42a to 42e erected on the edges of the top board 41, and is formed to have a shallow plate-like shape having the opening 22a on the front side (lower side, as viewed in FIG. 5). The top board 41 is formed to have a generally rectangular shape. Further, the top board 41 has a central portion formed with an opening 41a having an elliptic shape, and to the inner surface (surface toward the viewer as viewed in FIG. 5) of the top board 41 is attached the cover 43 which is transparent (or substantially transparent) and functions as a window for use in viewing the magnetic tape T from the outside of the casing body 3. In this case, as shown in FIGS. 5 and 8, the cover 43 is formed with annular protrusions 43a, in plan view, for supporting (positioning) the respective upper ends 12b of the hubs 12 of the tape reels.

As shown in FIGS. 2 and 3, the reel brake 4 is disposed within the casing body 3 in a manner slidable in a direction toward or away from the tape reels 2 and 2, and is urged by a brake spring 9c appearing in FIG. 1 in a direction in which the reel brake 4 is moved toward the tape reels 2 and 2. Further, the reel brake 4 is caused to slide in accordance with pivotal motions of the lid 8, thereby performing restriction of the rotations of the tape reels 2 and 2, and cancellation of the restriction of the rotations of the tape reels 2 and 2. As shown in FIG. 1, the sheets 5a and 5b correspond to sheet materials in the present invention, and each have insertion holes 51 through which the respective hubs 12 of the tape reels 2 can be inserted. In this case, as shown FIG. 9, the sheet 5a is arranged between a lower end 11e of the reel body 11 of each tape reel 2 and the bottom board 31 of the lower casing 21 (at a location on an insertion side of a drive shaft in the present invention), and the sheet 5b is arranged between an upper end 11c of the reel body 11 and the top board 41 of the upper casing 22 (at a location on an opposite side to the insertion side of the drive shaft in the present invention). Further, the sheets 5a and 5b have the functions of causing the tape reels 2 to rotate smoothly, and restricting motions of the magnetic tape T in the direction of the width thereof.

Figure 6:
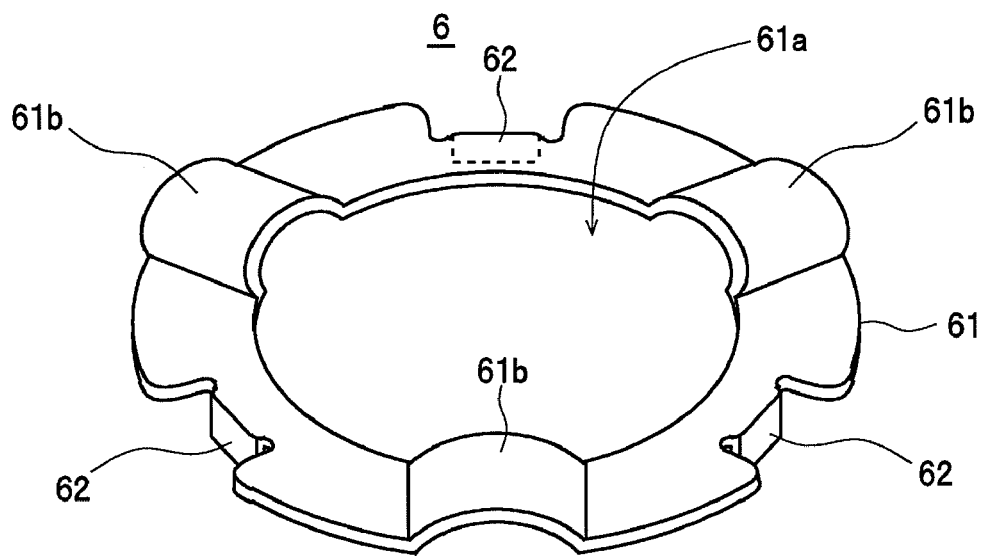
FIG. 6 is a side view of a spring member.

The spring members 6 correspond to urging members in the present invention. As shown in FIG. 6, each spring member 6 is comprised of a body portion 61, and three nails 62. Referring to FIGS. 6 to 8, the body portion 61 is formed by a plate-shaped body which is formed with an insertion hole 61a in a central portion thereof such that the upper end 12b of the hub 12 of the associated tape reel 2 can be inserted, and has a generally circular shape in plan view (i.e., a generally annular shape). In this case, as shown in FIG. 6, the body portion 61 is provided with three convex portions 61b formed by bending (press-working) the aforementioned plate-shaped body, and is configured such that the body portion 61 can be elastically deformed in the direction of the thickness thereof. The nails 62 are formed, as shown in FIGS. 6 and 8, by bending respective portions of the outer periphery of the body portion 61 in an opposite direction to the protruding direction of the convex portions 61b (downward direction as viewed in FIGS. 6 and 8). In this case, each nail 62 has a function of fixing the body portion 61 (spring member 6) to the cover 43 (upper casing 22) by being fitted on the outer periphery of the associated protrusion 43a of the cover 43 as shown in FIG. 8.

Here, each spring member 6 is fixed to the cover 43 by fitting the nails 62 on the protrusion 43a of the cover 43 as mentioned above (see FIGS. 5 and 9). Referring to FIG. 9, in an assembled state of the information medium 1, the spring member 6 is disposed in a gap between the sheet 5b disposed toward the upper end 11c (one end side, in the present invention) of the reel body 11 of an associated one of the tape reels 2 and the top board 41 (the cover 43) of the upper casing 22. Further, as shown in FIG. 7, in a state in which the upper end 12b of the hub 12 of the tape reel 2 is inserted into the insertion hole 61a, in an assembled state of the information medium 1, the spring member 6 urges three portions (e.g., portions indicated by P1 to P3 in FIG. 7) of the end face 11d of the upper end 11c of the reel body 11 toward the lower end 11e (i.e., the bottom board 31 of the lower casing 21) via the sheet 5b by the three convex portions 61b.

Referring to FIG. 3, the sliding section 7 is slidably mounted on the outside of the lower casing 21. Further, the sliding section 7 is urged toward the cutaway portion 31a of the lower casing 21 by a slider spring 9b appearing in FIG. 1. Referring to FIG. 3, the lid 8 is pivotally mounted on the front side (left side, as viewed in FIG. 3) of the casing body 3 (upper casing 22), and is pivotally moved by the drive unit to thereby open and close the opening 22a (tape draw-out opening 3a of the casing body 3) of the upper casing 22. Further, the lid 8 is urged in the direction of closing the opening 22a by a lid spring 9d appearing in FIG. 1.

Next, an example of a method of manufacturing the information medium 1 will be described with reference to the drawings.

Referring first to FIG. 1, the sliding section 7 is mounted on the outer side of the lower casing 21. Then, the slider spring 9b is mounted on the lower casing 21 of the casing body 3, while causing one end of the slider spring 9b to be engaged with the sliding section 7. Subsequently, as shown in FIG. 1, the sheet 5a is placed inside the bottom board 31 of the lower casing 21, and the tape reels 2 and 2 having the magnetic tape T wound therearound (illustration of the magnetic tape T is omitted in FIG. 1) are placed on the sheet 5. After that, the sheet 5b is placed on the tape reels 2 and 2.

Then, as shown in FIG. 5, the spring members 6 are fixed to the cover 43 which are mounted on the top board 41 of the upper casing 22 in advance. More specifically, as shown in FIG. 8, while positioning the nails 62 on the outer periphery of the protrusion 43a of the cover 43, the spring member 6 (body portion 61) is pressed in toward the cover 43 (in a direction indicated by an arrow A in FIG. 8). This fits the nails 62 on the outer periphery of the protrusion 43a, whereby the spring member 6 is fixed to the cover 43 (the top board 41 on which the cover 43 is mounted). In this case, the spring member 6 is fixed to the cover 43 only by fitting the nails 62 on the outer periphery of the protrusion 43a, and hence, compared with a construction in which the spring member 6 is fixed by seizing, the efficiency of the fixing operation is sufficiently improved.

Next, the lock springs 9a are mounted on the cover 43, whereafter the brake spring 9c is fitted into the upper casing 22. Then, the reel brake 4 is set to the upper casing 22, with one end of the brake spring 9c being engaged with the reel brake 4. Then, the lid 8 having the lid spring 9d mounted thereon is assembled to the front side of the upper casing 22. Next, as shown in FIG. 3, the lower casing 21 and the upper casing 22 are fitted to each other in a manner such that the end faces of the respective side walls 32a to 32e of the lower casing 21 and the end faces of the respective side walls 42a to 42e of the upper casing 22 are facing to each other. In doing this, the upper end 12b of the hub 12 of each tape reel 2 is inserted through the insertion hole 61a of the body portion 61 of each spring member 6, whereby the spring member 6 is disposed between the sheet 5b and the top board 41 (the cover 43) of the upper casing 22. In this case, since the spring member 6 is fixed to the cover 43 mounted on the top board 41, the spring member 6 is accurately disposed only by fitting the two casings 21 and 22 to each other. Further, since the spring member 6 is fixed to the cover 43, when fitting the casings 21 and 22 to each other, it is possible to positively prevent the spring member 6 from coming off. Therefore, it is possible to sufficiently improve the efficiency of the operation of fitting the casings 21 and 22 to each other. Subsequently, the casings 21 and 22 are secured by screws.

Next, a method of recording and reproduction of data using the information medium 1 will be described with reference to the drawings.

Referring to FIG. 3, in a state in which the information medium 1 is removed from the drive unit, not shown, that is, when the information medium 1 is not in use, the reel brake 4 is moved toward the tape reels 2 and 2 by the urging force of the brake spring 9c. As a result, the protrusions 4a and 4a of the reel brake 4 are engaged with the teeth 12c of the tape reels 2 and 2, respectively, whereby the rotations of the tape reel 2 and 2 are restricted. Further, as shown in FIG. 3, the lid 8 is urged by the lid spring 9d, whereby the opening 22a of the upper casing 22 of the casing body 3 is closed. Further, the sliding section 7 is located toward the cutaway portion 31a of the bottom board 31 of the lower casing 21, and closes the insertion holes 31b and 31b of the bottom board 31, and the cutaway portion 31a thereof.

On the other hand, when the information medium 1 is inserted into an inlet of the drive unit, the drive unit draws the information medium 1 therein. In doing this, the foremost ends of the locking portions 31c and 31c of the lower casing 21 are pushed upward, whereby the sliding section 7 is released from the non-slidable state. Then, the sliding section 7 is caused to slide toward the side wall 32a of the lower casing 21 (see FIG. 3), whereby the insertion holes 31b and the cutaway portion 31a of the lower casing 21 are opened. Subsequently, the drive unit moves the information medium 1 toward the foremost ends of the drive shafts 101 of the drive unit. In doing this, as shown in FIG. 9, the drive shafts 101 are inserted through the insertion holes 31b into the central portions of the hubs 12 of the tape reels 2, whereby the engaging protrusions 12d formed on the inner peripheral surfaces of the hubs 12, and the drive shafts 101 are engaged with each other. In this case, as described above, the information medium 1 employs the magnetic tape T having a tape width of 8 mm, and the reel body 11 and the hub 12 of each tape reel 2 are formed to be longer (thicker) than those of the conventional information medium which employs a magnetic tape T having a tape width of 4 mm. Therefore, as shown in FIG. 9, the insertion of the drive shafts 101 (motion of the information medium 1) is stopped in a state in which the foremost end of each drive shaft 101 has reached a position corresponding to approximately one third of the whole length of each hub 12 from the lower end 12a of the hub 12.

Figure 10:
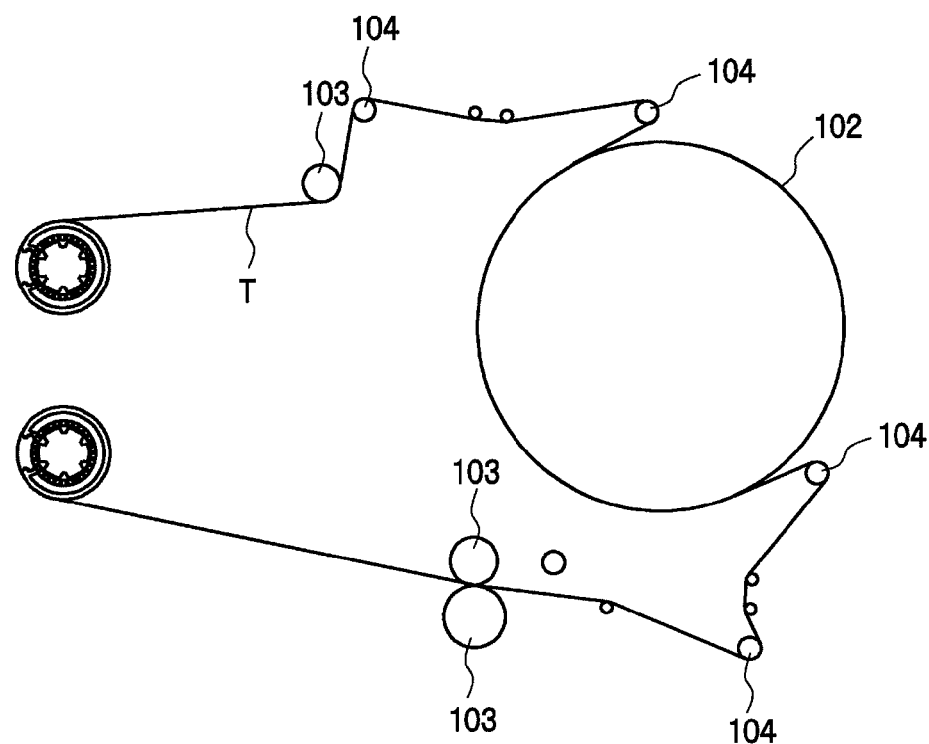
FIG. 10 is a diagram which is useful in explaining a state of the information medium in which a magnetic tape is brought into contact with a rotary head.

Then, when the drive unit moves the information medium 1 downward toward the front end of the drive shaft 101, the drive unit pivotally moves the lid 8 against the urging force of the lid spring 9d, whereby as shown in FIG. 9, the opening 22a of the upper casing 22 is opened. Further, in accordance with the pivotal motion of the lid 8, the reel brake 4 is moved toward the opening 22a, whereby the teeth 12c of the tape reels 2 and 2 and the protrusions 4a and 4a of the reel brake 4 are disengaged from each other, to thereby release the restriction of the rotations of the tape reels 2 and 2. Subsequently, as shown in FIG. 10, the drive unit moves guide rollers 103 and guide pins 104 to thereby bring the magnetic tape T into contact with approximately one half of the whole outer peripheral surface of a rotary head 102. Then, the drive unit rotates the rotary head 102 and the drive shafts 101, to start reading or writing of data. In doing this, the tape reels 2 and 2 are rotated, whereby the magnetic tape T is fed from one tape reel 2 to the other tape reel 2 via a path shown in FIG. 12, for being taken up by the other tape reel 2.

In this case, the end face 11d of the upper end 11c of the reel body 11 of each tape reel 2 is urged by the spring member 6 toward the bottom board 31 of the lower casing 21, and therefore as shown in FIG. 9, an end face 11f of the lower end lie of the reel body 11 is urged against the bottom board 31 via the sheet 5a. Therefore, even when a relatively large tension is applied to the magnetic tape T so as to bring the magnetic tape T into contact with the rotary head 102, and a large moment acts on the reel body 11 (tape reel 2) due to the tension, the tape reel 2 is positively prevented from being inclined. This positively prevents proper recording or reproduction of data from being hindered by running of the magnetic tape T in a meandering manner or in a state laterally shifted toward one side, which is caused by the rotations of inclined tape reels 2. Further, since the spring members 6 are fixed to the top board 41 (cover 43) of the casing body 3, they are positively prevented from being removed from the upper ends 12b of the hubs 12 to be thereby brought into contact with the magnetic tape T, e.g., by vibration caused by rotation of the tape reel 2. Further, in this information medium 1, by fitting the nails 62 on the associated protrusion 43a of the cover 43, the spring 6 is fixed to the cover 43. Therefore, differently from the construction in which the spring member 6 is fixed to the cover 43 by swaging, the spring member 6 can positively urge the tape reel 2 without the elastic deformation thereof (of the body portion 61) being hampered.

Then, when the reading or writing of data has been terminated, the drive unit causes the information medium 1 to move away from the foremost ends of the drive shafts 101. Then, the drive unit pivotally moves the lid 8, thereby causing the lid 8 to close the opening 22a of the upper casing 22. Further, the reel brake 4 is moved toward the tape reels 2 by the urging force of the brake spring 9c in accordance with the pivotal motion of the lid 8, and the teeth 12c of the tape reels 2 and 2 and the protrusions 4a and 4a of the reel brake 4 are engaged with each other, to thereby restrict the rotations of the tape reels 2 and 2. Then, the drive unit pushes out the information medium 1 toward the outside of the inlet of the drive unit. In doing this, as shown in FIG. 3, the sliding section 7 is caused to slide toward the cutaway portion 31a of the bottom board 31 of the lower casing 21 to thereby close the cutaway portion 31a and the insertion holes 31b and 31b. This enables the information medium 1 to be taken out from the inlet of the drive unit.

As described above, according to the information medium 1, the spring members 6 are arranged between the sheet 5b and the top board 41 of the upper casing 22 of the casing body 3, whereby the respective end faces 11d of the upper ends 11c of the reel bodies 11 of the tape reels 2 can be urged toward the bottom board 31 of the lower casing 21 by the spring members 6. This makes it possible to urge the end faces 11f of the lower ends 11e against the bottom board 31 of the lower casing 21 via the sheet 5a. As a result, even when a relatively large tension is applied to the magnetic tape T so as to bring the magnetic tape T into contact with the rotary head 102 of the drive unit, and a large moment acts on the tape reels 2 due to the tension, the tape reels 2 can be positively prevented from being inclined. Therefore, according to the information medium 1, it is possible to positively prevent the recording or reproduction of data from being hindered by running of the magnetic tape T in a meandering manner or in a state laterally shifted toward one side, which can be caused by the rotations of inclined tape reels 2, or the magnetic tape T from being damaged by having an edge (end in the direction of the width) thereof rubbed hard against the sheet 5.

Further, by configuring the spring member 6 such that it can be fitted on the outer periphery of each protrusion 43a formed on the cover 43 mounted on the top board 41, it is possible to fix the spring members 6 to the cover 43 only fitting the spring members 6 on the outer periphery of the associated protrusions 43a. Therefore, compared with the construction in which the spring member is fixed by seizing, it is possible to sufficiently improve the efficiency of the fixing operation. Further, by fixing the spring members 6 to the cover 43 in advance, it is possible to positively prevent the spring member 6 from coming off when fitting the upper casing 22 and the lower casing 22 to each other. As a result, it is possible to sufficiently improve the efficiency of the operation of fitting the two casings 21 and 22. Therefore, according to the information medium 1, it is possible to sufficiently improve the manufacturing efficiency. Further, since each spring member 6 is fixed to the cover 43 by fitting the same on the outer periphery of the associated protrusion 43a, it is possible to positively urge the tape reel 2 by the spring member 6 without the elastic deformation of the spring member 6 being hampered, differently from the construction in which the spring member 6 is fixed to the cover by swaging.

Further, according to this information medium 1, the spring member 6 is configured such that it is provided with the nails 62 for being fitted on the outer periphery of the protrusion 43a, so that the nails 62 can be formed by a simple working process of bending outer peripheral portions of the body portion 61 of the spring member 6, which makes it possible to hold the manufacturing cost of the spring member to at a low level.

Further, according to this information medium 1, the spring member 6 is configured such that it is provided with the three nails 62. Therefore, differently from a spring member which is provided with not more than two nails 62, the spring member 6 can be fixed to the cover 43, i.e., the upper end face lid of the upper end 11c of the reel body 11 of each tape reel 2 such that the body portion 61 is parallel or substantially parallel thereto. Therefore, it is possible to evenly urge the end face 11d via the sheet 5b, whereby it is possible to more positively prevent the tape reel 2 from being inclined. Further, compared with a spring member which is provided with four or more nails 62, the working of the spring member 6 is easy to carry out, so that it is possible to hold the manufacturing cost of the spring member 6 at a further lower level.

Further, according to this information medium 1, since the spring member 6 is formed such that it is provided with three convex portions 61b which can urge three portions of the upper end 11c of the reel body 11, respectively, differently from a spring member which has two or less or four or more convex portions, all the three convex portions 61b positively urge the end face 11d via the sheet 5b, and hence it is possible to evenly urge the end face 11d. As a result, it is possible to more positively prevent the tape reel 2 from being inclined.

Figure 11:
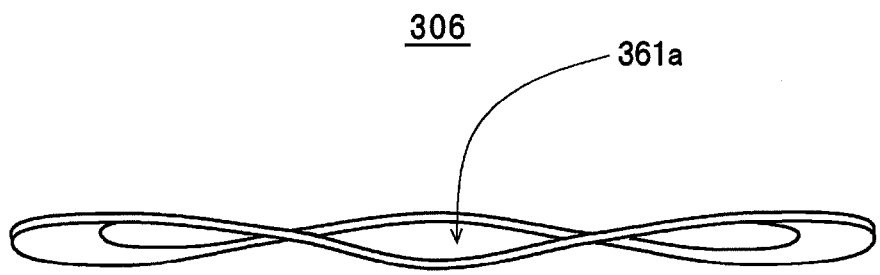
FIG. 11 is a plan view of a variation of the spring members.

It should be noted that the present invention is not limited to the above-described configurations. For example, although the above description is given of an example in which the spring member 6 is provided with the nails 62, it is also possible to employ a spring member 306 which is not provided with any nail 62. In this case, as shown in FIG. 11, the spring member 306 is configured to have a shape formed by providing an insertion hole 361a in the center of a substantially circular (i.e., substantially annular) plate-shaped body thereof such that an upper end 12b of the hub 12 of the tape reel 2 can be inserted therein, and bending the plate-shaped body in a wavy fashion (into the shape of a wave washer). In this case, the diameter of the insertion hole 361a is defined to be substantially equal to the outer diameter of the outer periphery of the protrusion 43a of the cover 43.

Figure 12:
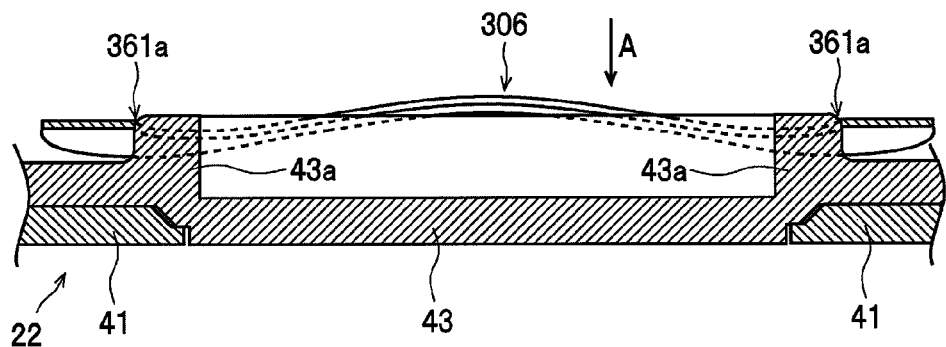
FIG. 12 is a diagram which is useful in explaining a method of mounting another spring member on the cover.

In fixing the spring member 306 to the cover 43, the spring member 306 is pushed in toward the cover 43 (in a direction indicated by an arrow A in FIG. 12) while positioning the rim of the insertion hole 361a on the outer periphery of the protrusion 43a of the cover 43, as shown in FIG. 12. This fits the rim of the insertion hole 361a on the outer periphery of the protrusion 43a, whereby the spring member 306 is fixed to the cover 43 (the top board 41 on which the cover 43 is mounted). In this spring member 306 as well, only by fitting the rim of the insertion hole 361a on the outer periphery of the protrusion 43a, the spring member 306 can be fixed to the cover 43. Therefore, also in the information medium provided with the spring member 306, it is possible to sufficiently improve the efficiency of the operation of fixing the spring members 306, that of the operation of fitting the upper casing 22 and the lower casing 21 to each other, and in turn, the manufacturing efficiency of the information medium.

Figure 13:
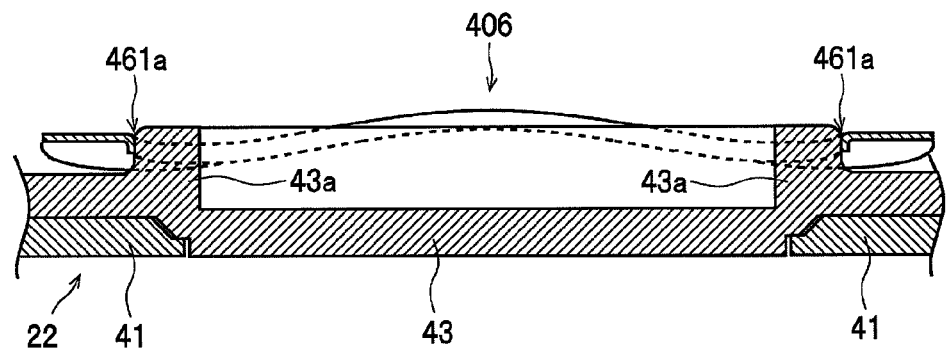
FIG. 13 is a diagram which is useful in explaining a method of mounting still another spring member on the cover.
Figure 14:
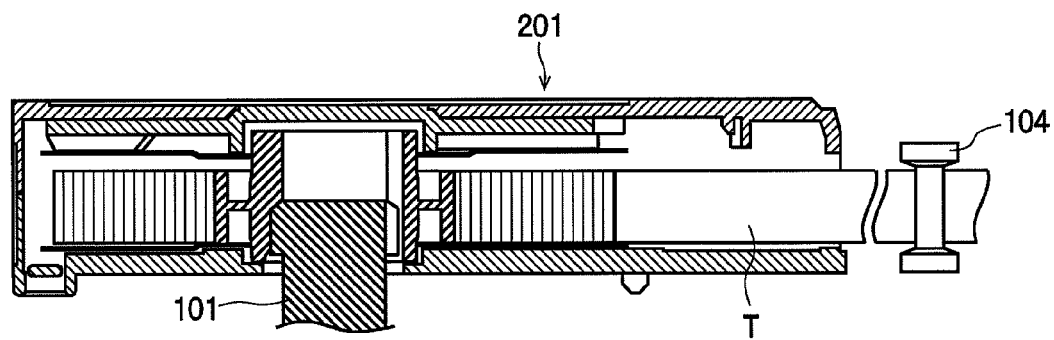
FIG. 14 is a cross-sectional view of a conventional information medium (tape cartridge)
Figure 15:
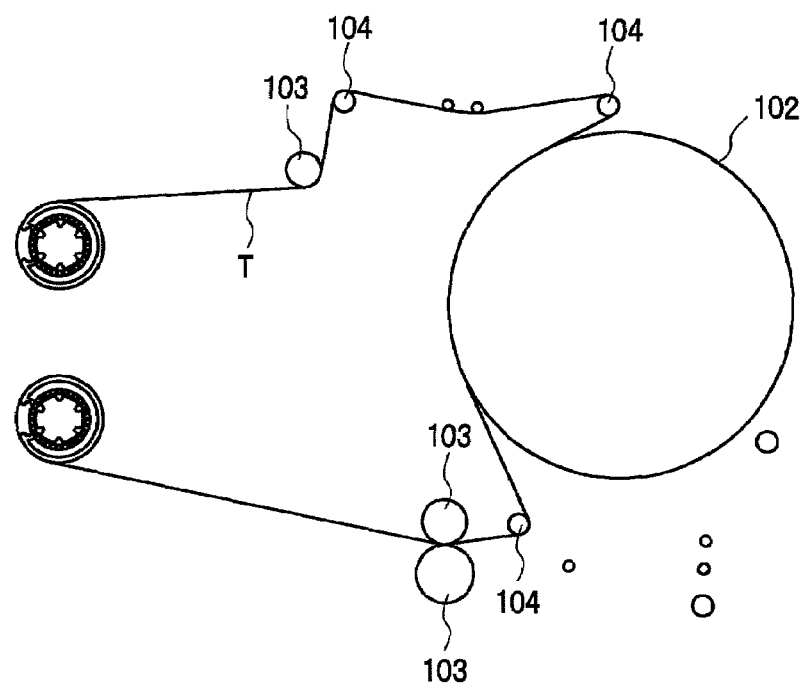
FIG. 15 is a diagram which is useful in explaining a state of the conventional information medium (tape cartridge) in which a magnetic tape is brought into contact with a rotary head.
Figure 16:
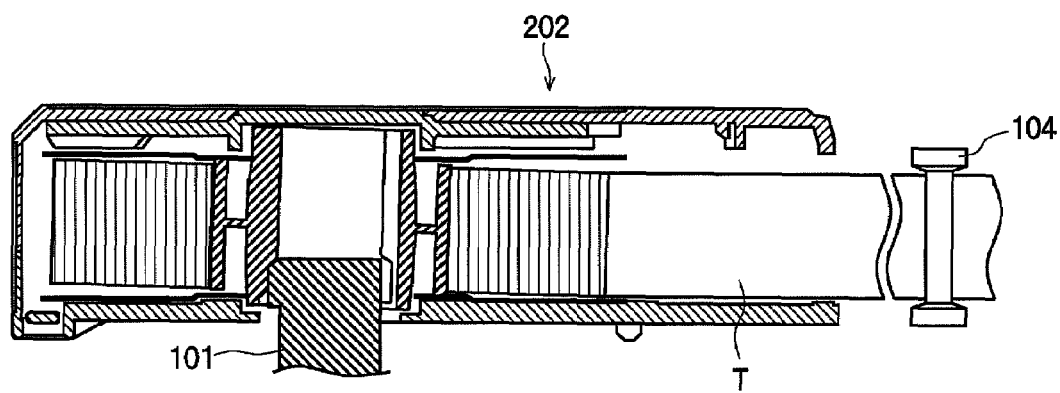
FIG. 16 is a cross-sectional view of a conventional information medium (tape cartridge) using a magnetic tape increased in width.

Further, as shown in FIG. 13, it is also possible to employ a spring member 406 which is formed by bending a peripheral edge of an insertion hole corresponding to the rim of the insertion hole 361a. In this spring member 406, as shown in FIG. 13, when fitting the rim of the insertion hole 461a on the outer periphery of the protrusion 43a of the cover 43, it is possible to prevent the outer periphery of the protrusion 43a from being shaved off by a burr on the rim of the insertion hole 461a, and shavings from being scattered into the casing body 3.

Further, although in the above-described embodiment, the description has been given of an example in which the present invention is applied to the information medium 1 for use in backing up data recorded on an electronic computer, the present invention can be applied to various information media, such as an information medium for use in recording image data, and an information medium for use in recording voice data.

What is claimed is:

1. An information medium comprising:
    a pair of tape reels each having a hollow cylindrical reel body having a magnetic tape wound therearound, and a hollow cylindrical hub disposed at a central portion of the reel body in a manner such that opposite ends thereof protrude from the reel body;
    a casing body rotatably accommodating the pair of tape reels in a state holding opposite ends of the hubs by a pair of main boards facing each other, one of the main boards being formed with a pair of annular protrusions, for positioning associated ones of the ends of the hubs;
    a pair of sheet materials each having a pair of insertion holes formed therein, and arranged in the casing body in a manner sandwiching opposite ends of each reel body in a state having the opposite ends of the hubs inserted into the insertion holes; and
    a pair of plate-shaped urging members arranged between one of the sheet materials, which is disposed on a side opposite to an insertion side of a drive shaft that drives the tape reel, and the one of the main boards, each urging member being formed with an insertion hole that urges the ends of the reel bodies via the one of the sheet materials, in a state thereof in which each urging member has an associated one of the ends of the hubs inserted into the insertion hole thereof, the urging member being configured to be capable of being fixed to the one of the main boards, by being fitted on an outer periphery of an associated one of the annular protrusions.

2. An information medium according to claim 1, wherein each urging member is configured to be provided with fixing nails for being fitted on the outer periphery of the associated one of the annular protrusions.

3. An information medium according to claim 2, wherein each urging member is configured to be provided with three of the nails.

4. An information medium according to claim 1, wherein each said urging member is configured to comprise three protrusions capable of urging three portions of an associated one of the ends of the reel body via the one of the sheet materials.

* * * * *